US008644789B2

(12) United States Patent
Knoblach et al.

(10) Patent No.: US 8,644,789 B2
(45) Date of Patent: Feb. 4, 2014

(54) UNMANNED LIGHTER-THAN-AIR-SAFE TERMINATION AND RECOVERY METHODS

(75) Inventors: Gerald M. Knoblach, Chandler, AZ (US); Eric A. Frische, Sun Lakes, AZ (US)

(73) Assignee: Space Data Corporation, Chandler, AZ (US)

( * ) Notice: Subject to any disclaimer, the term of this patent is extended or adjusted under 35 U.S.C. 154(b) by 1175 days.

(21) Appl. No.: 11/783,234

(22) Filed: Apr. 6, 2007

(65) Prior Publication Data

US 2007/0184810 A1   Aug. 9, 2007

Related U.S. Application Data

(62) Division of application No. 10/129,666, filed as application No. PCT/US02/12228 on Apr. 18, 2002, now Pat. No. 7,203,491.

(60) Provisional application No. 60/284,799, filed on Apr. 18, 2001.

(51) Int. Cl.
| | |
|---|---|
| *H04B 1/16* | (2006.01) |
| *H04B 1/00* | (2006.01) |
| *H04B 7/00* | (2006.01) |
| *H02J 7/00* | (2006.01) |

(52) U.S. Cl.
USPC .......... 455/343.1; 455/68; 320/134; 320/135; 320/136

(58) Field of Classification Search
USPC ................. 455/343.1, 68; 320/134, 135, 136
See application file for complete search history.

(56) References Cited

U.S. PATENT DOCUMENTS

| | | | |
|---|---|---|---|
| 2,151,336 | A | 3/1939 | Scharlau |
| 2,366,423 | A | 1/1945 | Pear, Jr. |
| 2,462,102 | A | 2/1949 | Istvan |
| 2,542,823 | A | 2/1951 | Lyle |
| 2,598,064 | A | 5/1952 | Lindenblad |
| 2,626,348 | A | 1/1953 | Nobles |
| 3,030,500 | A | 4/1962 | Katzin |

(Continued)

FOREIGN PATENT DOCUMENTS

| | | |
|---|---|---|
| DE | 1188951 | 3/1965 |
| EP | 1058409 | 12/2000 |

(Continued)

OTHER PUBLICATIONS

Koelsch et al., "A Deep Towed Explosive Source for Seismic Experiments on the Ocean Floor", Dec. 1986, Marine Geophysical Researches, vol. 8, No. 4, pp. 345-361.*

(Continued)

*Primary Examiner* — Opiribo Georgewill
(74) *Attorney, Agent, or Firm* — Pillsbury Winthrop Shaw Pittman LLP (57) ABSTRACT

Innovative new methods in connection with lighter-than-air free floating platforms, of facilitating legal transmitter operation, platform flight termination when appropriate, environmentally acceptable landing, and recovery of these devices are provided. Especially, termination of radio transmissions and flight related to regional, governmental and international border requirements, regulations and laws. The new methods comprise specific criteria, detection of the criteria and elements of operation for reducing or preventing illegal transmissions, for producing rapid descent to the ground, for environmentally acceptable landing and for facilitating recovery all with improved safety and enhanced compliance with known regulations.

20 Claims, 9 Drawing Sheets

(56) References Cited

U.S. PATENT DOCUMENTS

| | | | |
|---|---|---|---|
| 3,030,509 | A | 4/1962 | Carlson |
| 3,045,952 | A | 7/1962 | Underwood |
| 3,058,694 | A | 10/1962 | Fazio et al. |
| 3,174,705 | A | 3/1965 | Schiff et al. |
| 3,206,749 | A | 9/1965 | Chatelain |
| 3,384,891 | A | 5/1968 | Anderson |
| 3,404,278 | A | 10/1968 | Chope |
| 3,471,856 | A | 10/1969 | Laughlin, Jr. et al. |
| 3,555,552 | A | 1/1971 | Alford |
| 3,674,225 | A | 7/1972 | Johnson |
| 3,742,358 | A | 6/1973 | Cesaro |
| 3,781,893 | A | 12/1973 | Beukers et al. |
| 3,781,894 | A | 12/1973 | Ancona et al. |
| RE28,725 | E | 2/1976 | Hutchinson et al. |
| 4,123,987 | A | 11/1978 | Singerle et al. |
| 4,249,181 | A | 2/1981 | Lee |
| 4,262,864 | A | 4/1981 | Eshoo et al. |
| 4,394,780 | A | 7/1983 | Mooradian |
| 4,419,766 | A | 12/1983 | Goeken et al. |
| 4,472,720 | A | 9/1984 | Reesor |
| 4,481,514 | A | 11/1984 | Beukers et al. |
| 4,509,053 | A | 4/1985 | Robin et al. |
| 4,595,928 | A | 6/1986 | Wingard |
| 4,635,187 | A * | 1/1987 | Baron et al. ............... 718/100 |
| 4,696,052 | A | 9/1987 | Breeden |
| 4,704,735 | A * | 11/1987 | Swapp et al. ............... 455/68 |
| 4,747,160 | A | 5/1988 | Bossard |
| 4,868,577 | A | 9/1989 | Wingard |
| 4,979,170 | A | 12/1990 | Gilhousen et al. |
| 4,995,572 | A | 2/1991 | Piasecki |
| 5,005,513 | A | 4/1991 | Van Patten et al. |
| 5,029,244 | A * | 7/1991 | Fowler ............... 219/497 |
| 5,067,172 | A | 11/1991 | Schloemer |
| 5,119,397 | A | 6/1992 | Dahlin et al. |
| 5,121,128 | A | 6/1992 | van Lidth de Jeude et al. |
| 5,123,112 | A | 6/1992 | Choate |
| 5,175,556 | A | 12/1992 | Berkowitz |
| 5,189,734 | A | 2/1993 | Bailey et al. |
| 5,204,970 | A | 4/1993 | Stengel et al. |
| 5,212,804 | A | 5/1993 | Choate |
| 5,214,793 | A | 5/1993 | George |
| 5,218,366 | A | 6/1993 | Cardamone et al. |
| 5,235,633 | A | 8/1993 | Dennison et al. |
| 5,239,668 | A | 8/1993 | Davis |
| 5,287,541 | A | 2/1994 | Davis et al. |
| 5,327,572 | A | 7/1994 | Freeburg |
| 5,420,592 | A | 5/1995 | Johnson |
| 5,430,656 | A | 7/1995 | Dekel et al. |
| 5,433,726 | A | 7/1995 | Horstein et al. |
| 5,439,190 | A | 8/1995 | Horstein et al. |
| 5,444,762 | A | 8/1995 | Frey et al. |
| 5,455,823 | A | 10/1995 | Noreen et al. |
| 5,467,681 | A | 11/1995 | Liberman |
| 5,471,641 | A | 11/1995 | Dosiere et al. |
| 5,519,761 | A | 5/1996 | Gilhousen |
| 5,533,029 | A | 7/1996 | Gardner |
| 5,557,656 | A | 9/1996 | Ray et al. |
| 5,559,865 | A | 9/1996 | Gilhousen |
| 5,584,047 | A | 12/1996 | Tuck |
| 5,615,409 | A | 3/1997 | Forssen et al. |
| 5,645,248 | A | 7/1997 | Campbell |
| 5,649,000 | A | 7/1997 | Lee et al. |
| 5,717,937 | A * | 2/1998 | Fritz ............... 713/300 |
| 5,748,620 | A | 5/1998 | Capurka |
| 5,759,712 | A | 6/1998 | Hockaday |
| 5,788,187 | A | 8/1998 | Castiel et al. |
| 5,815,407 | A * | 9/1998 | Huffman et al. ............... 702/57 |
| 5,825,155 | A * | 10/1998 | Ito et al. ............... 320/118 |
| 5,832,380 | A | 11/1998 | Ray et al. |
| 5,835,059 | A | 11/1998 | Nadel et al. |
| 5,909,299 | A | 6/1999 | Sheldon, Jr. et al. |
| 6,061,562 | A | 5/2000 | Martin et al. |
| 6,167,263 | A | 12/2000 | Campbell |
| 6,324,398 | B1 | 11/2001 | Lanzerotti et al. |
| 6,414,947 | B1 | 7/2002 | Legg et al. |
| 6,495,989 | B1 * | 12/2002 | Eguchi ............... 320/132 |
| 6,628,941 | B2 | 9/2003 | Knoblach et al. |
| 7,203,491 | B2 | 4/2007 | Knoblach et al. |
| 2001/0005683 | A1 | 6/2001 | Zicker et al. |

FOREIGN PATENT DOCUMENTS

| | | |
|---|---|---|
| GB | 2216319 | 10/1989 |
| JP | 950826 | 2/1997 |
| JP | 2000284022 A * | 10/2000 |
| WO | 9504407 | 2/1995 |
| WO | 9602094 | 1/1996 |
| WO | 0101710 | 1/2001 |

OTHER PUBLICATIONS

Koelsch et al., "A Deep Towed Explosive Source for Seismic Experiments on teh Ocean Floor", Dec. 1986, Marine Geophysical Researches, vol. 8, No. 4, pp. 345-361.*

David A Broan "Balloon Technology Offers High-Altitude Applications" Aviation Week & Space Technology, Nov. 16, 1992, pp. 56-57.

Crouch et al., "Ballon and Airship" Compton's Interactive Encyclopedia, 5 pages excerpt, 1993-1994.

* cited by examiner

UNMANNED LIGHTER-THAN-AIR-SAFE TERMINATION AND RECOVERY METHODS

RELATED APPLICATIONS

This application is a divisional application of U.S. Ser. No. 10/129,666, filed May 9, 2002, which is a National Stage application of PCT/US02/12228, filed Apr. 18, 2002, which claims priority from U.S. Provisional Application 60/284,799, filed Apr. 18, 2001, which is incorporated herein by reference.

TECHNICAL FIELD OF THE INVENTION

The present invention relates to unmanned lighter-than-air platforms operating in the stratosphere and more particularly, their termination and recovery.

BACKGROUND OF THE INVENTION

Unmanned lighter-than-air ballooncraft have been used for many years to perform tasks such as near space research, and meteorological measurements. Such ballooncraft have even carried payloads with instrumentation that sometimes includes radio transmission capabilities.

SUMMARY OF THE INVENTION

One embodiment of this invention is a system comprising a free-floating platform and a communication device that is separate from the platform, the platform comprising a lighter-than-air gas enclosure and a payload, the payload comprising a processor and a transceiver, wherein the processor is capable of making a decision to terminate a flight of the platform, the transceiver is capable of receiving a signal from the communication device, and the communication device is capable of handing off the signal to another transceiver of another free-floating platform. The payload could further comprise an altitude sensor, a position sensor and a power source. Typically, the payload is within 500 feet of the lighter-than-air gas enclosure.

The decision is based at least in part on (a) if the platform is determined to be outside specified geographic boundaries; (b) if the platform is outside of a specified altitude range; (c) if the platform has a lateral or vertical velocity outside a specified range; (d) if the processor fails; (e) if a power source fails (f) if a command and control communications link fails.

The decision could be releasing of a ballast, stopping a signal to a discharge circuit to prevent a battery from discharging, releasing the platform from the payload, or combination thereof.

Another embodiment of this invention is a method of terminating a flight of a free floating platform, wherein the platform comprises a transceiver capable of receiving a signal from a communication device that is separate from the platform, the method comprising determining a geographic position and/or a velocity of the platform, making a decision with a processor on the platform to terminate the flight of the platform, handing off the signal to another transceiver of another free-floating platform and terminating the flight of the platform.

Yet another embodiment is a system for ascending or slowing the descent of a free floating platform, comprising a lighter-than-air gas enclosure and a ballast comprising reactants that form a gas that is lighter than air when said reactants are mixed. The gas could be hydrogen and the reactants could comprise water and a hydride of Ca or Na. At least one of the reactants should be heavier than air. For example, at least one of the reactants could be a hydrocarbon. The system could further comprise a catalyst for reforming at least one of the reactants.

Another embodiment of this invention is a method for ascending or slowing descent of a free floating platform, said method comprising reacting reactants stored on the platform to form spent reactants and a gas that is lighter than air, introducing the gas into a lighter-than-air gas enclosure and dropping the spent reactants.

Another embodiment of this invention is a system for terminating a flight of a free floating platform, comprising a lighter-than-air gas enclosure, a payload and an element, wherein the element is capable of separating the gas enclosure from the payload. The element could comprise a line and a component capable of breaking the line. The system could further comprise two axially aligned tubes connecting the payload to the gas enclosure. In a preferred embodiment, the element could be a pin.

Yet another embodiment of this invention is a method for terminating a flight of a free floating platform comprising a lighter-than-air gas enclosure, a payload and an element, wherein the method comprises separating the lighter-than-air gas enclosure from the payload by an action of the element. The method could further comprise passing current through the element.

Another embodiment of this invention is a power system comprising a battery, a processor and a discharge circuit, wherein the processor intermittently sends a signal to the discharge circuit to prevent the battery from discharging. Preferably, the processor stops sending the signal when the power system lands on ground or water.

Yet another embodiment of this invention is a method of recovering a free floating platform, comprising landing the platform on ground or water and sending a position of the platform to a transceiver located on another free floating platform. The method could further comprise transmitting the position from the transceiver located on another free floating platform to a transceiver located in a ground station.

Another embodiment of this invention is a system for terminating a flight of a free floating platform, comprising a lighter than air gas enclosure, a payload and means for releasing the gas enclosure from the payload. The means for releasing the gas enclosure of those disclosed in the specification and equivalents thereof.

BRIEF DESCRIPTION OF THE DRAWINGS

A better understanding of the invention may be had with reference to the attached drawing Figures in connection with the Detailed Description below in which like numerals represent like elements and in which.

DETAILED DESCRIPTION OF THE INVENTION

It has been found that the previous largest use of unmanned lighter-than-air ballooncraft has been by the various weather services of the world. For weather data acquisition purposes small latex weather balloons carry instrument packages called radiosondes to gather weather data. These weather balloons are launched from a network of sites around the world at noon and midnight Greenwich Mean Time each day. The weather service radiosondes collect temperature, humidity, pressure and wind data as they rise from the surface of the Earth to approximately 100,000 feet during a two-hour ascent. At approximately 100,000 feet the weather balloons burst and the radiosonde payload falls to earth on a parachute. This data acquire during the ascent is input into atmospheric models run on supercomputers to facilitate predicting the weather. The input data is limited as it represents only a snapshot of the weather data taken during the balloon ascent every 12 hours. The ascent and decent are rapid, mostly landing within the originating country's borders such that the short duration radio transmissions and physically crossing borders are not major issues. Also, most countries of the world are bound by treaty to launch balloon carried radiosondes from designated sites and to share the data with other countries.

Currently there are about 800,000 radiosondes launched each year throughout the world. There are also a small number of research balloons launched for research purposes. The research balloon may be quite large and flights typically are done using special frequencies and with international or individual country permission for border crossing. The total number of balloon flights per year primarily consists of the 997 global weather stations launching two radiosondes per day, 365 days per year (727,000). Only about 18% of these radiosondes are recovered, reconditioned and reclaimed, resulting in the new production of about 650,000 weather-gathering radiosondes per year.

The Federal Communications Commission (FCC) prohibits uncontrolled transmitters as they may cause interference to users on the same frequency or others on nearby frequencies. FCC spectrum licenses generally prohibit a US licensed transmitter from transmitting when it leaves the border of the US.

It has been found that most lighter-than-air platforms that maintain altitude must drop ballast in order to maintain altitude as lifting gas is lost through the balloon membrane and as the heating effect of the sun is lost as night approaches. The Federal Aviation Administration (FAA) regulations Section 101.7 states that unmanned ballooncraft are prohibited from dropping objects or operation such that a hazard may occur.

Sec. 101.7 Hazardous Operations (a) No person may operate any moored balloon, kite, unmanned rocket, or unmanned free balloon in a manner that creates a hazard to other persons, or their property.

(b) No person operating any moored balloon, kite, unmanned rocket, or unmanned free balloon may allow an object to be dropped therefrom, if such action creates a hazard to other persons or their property.

Sec. 6(c), Department of Transportation Act (49 U.S.C. 1655(c))

Doc. No. 12800, Amdt. 101-4, 39 FR 22252, Jun. 21, 1974

A major factor influencing the size and cost of a lighter-than-air platform is the weight of the payload. For small ballooncraft such as weather balloons, they may become exempt from certain FAA reporting, lighting, and launching requirements if the total payload weight is kept below 6 pounds and a density of 3 ounces or less per square inch of the smallest side.

Sec. 101.1 (4) Applicability

This part prescribes rules governing the operation in the United States, of the following:

(4) Except as provided for in Sec. 101.7, any unmanned free balloon that—
  (i) Carries a payload package that weighs more than four pounds and has a weight/size ratio of more than three ounces per square inch on any surface of the package, determined by dividing the total weight in ounces of the payload package by the area in square inches of its smallest surface;
  (ii) Carries a payload package that weighs more than six pounds;
  [Doc. No. 1580, 28 FR 6721, Jun. 29, 1963, as amended by Amdt. 101-1, 29 FR 46, Jan. 3, 1964; Amdt. 101-3, 35 FR 8213, May 26, 1970]

The unique use of a light, and low density payload also significantly reduces costs associated with the launch and allows a launch to occur in all weather conditions. The amount of ballast required to keep a platform within a set altitude range over a 24 hour period is typically on the order of 15% of the total system weight. This is a significant percentage of the total weight for a floating platform especially for ballooncraft missions that may last multiple days. For example, it has been found that a three day flight may require that 38% of the platform's system weight be ballast. This results in either significantly increasing the size of the balloon or decreases the weight available for the payload.

The two sections of the FAA regulations above show the FAA's concern with increased payload weights and densities. This concern appears to focus on reducing the potential for damage to an aircraft in a collision. The density and total weight of the payload are also found to be significant factors in overall safety upon the payload's return to the earth. Generally lower weight and density payloads, are believed to reduce the chances of causing physical damage, and as a beneficial result may also be easier and less costly to insure as well.

The FAA further prohibits uncontrolled lighter-than-air free drifting balloons. Again there may be a concern that uncontrolled flight may present a hazard to aircraft. For example, in 1998, the Canadian Space Agency lost control of a large scientific balloon. This prompted re-routing of trans-Atlantic passenger flights for 10 days as the balloon drifted from its launch site in Canada until it finally landed in Finland. The uncontrolled balloon also resulted in aviation concerns in Russia and Norway. Significant resources were expended, including the use of fighter jets to try to bring the uncontrolled balloon down.

Until now, unmanned, free drifting, lighter-than-air balloons have been either restricted to short flights as is the case with the 50,000 NWS weather balloons launched each year, or a very few large and expensive long duration scientific flights. The NWS weather balloons have an extremely limited life (approximately 2 hours) and their transmitters and batteries have limited power. The long duration scientific balloons typically have long lives and extended missions. These infrequent ballooncraft flights are expensive and generally require frequency and safety coordination with each country that they overfly. They may gain authorization to use government or scientific frequencies for short periods of time that are not available for commercial users.

Applicants, as disclosed in a co-pending application, have discovered and developed new and commercially viable uses for small free floating platforms with long duration capabilities. These small, long duration ballooncraft or free floating platforms have long flight lives similar to much larger scientific ballooncraft and the ability to travel long distances. The present methods and inventive devices also facilitate reducing the massive reporting and coordination requirements of the larger ballooncraft. The free floating platforms may be operating on commercial frequencies that have specific laws as to the use of the frequencies in each country. The innovative new methods facilitate maintenance of legal transmitter operations, particularly at borders, they provide for platform flight termination for rogue, uncontrolled or malfunctioning platforms, they provide for environmentally acceptable descent and they enhance the opportunity for recovery and reuse of these devices. All of these methods are especially useful as they relate to regional and international borders. The present invention uses specific criteria and elements of operation or sets of criteria and elements of operation that taken as a whole form a safe method for reducing or preventing illegal transmissions, for terminating flight, for rapidly descending the platform to the ground, for environmentally acceptable landing and for enhanced, recovery. All the methods are designed to enhance safety and to comply with known regulations.

Figure 1:
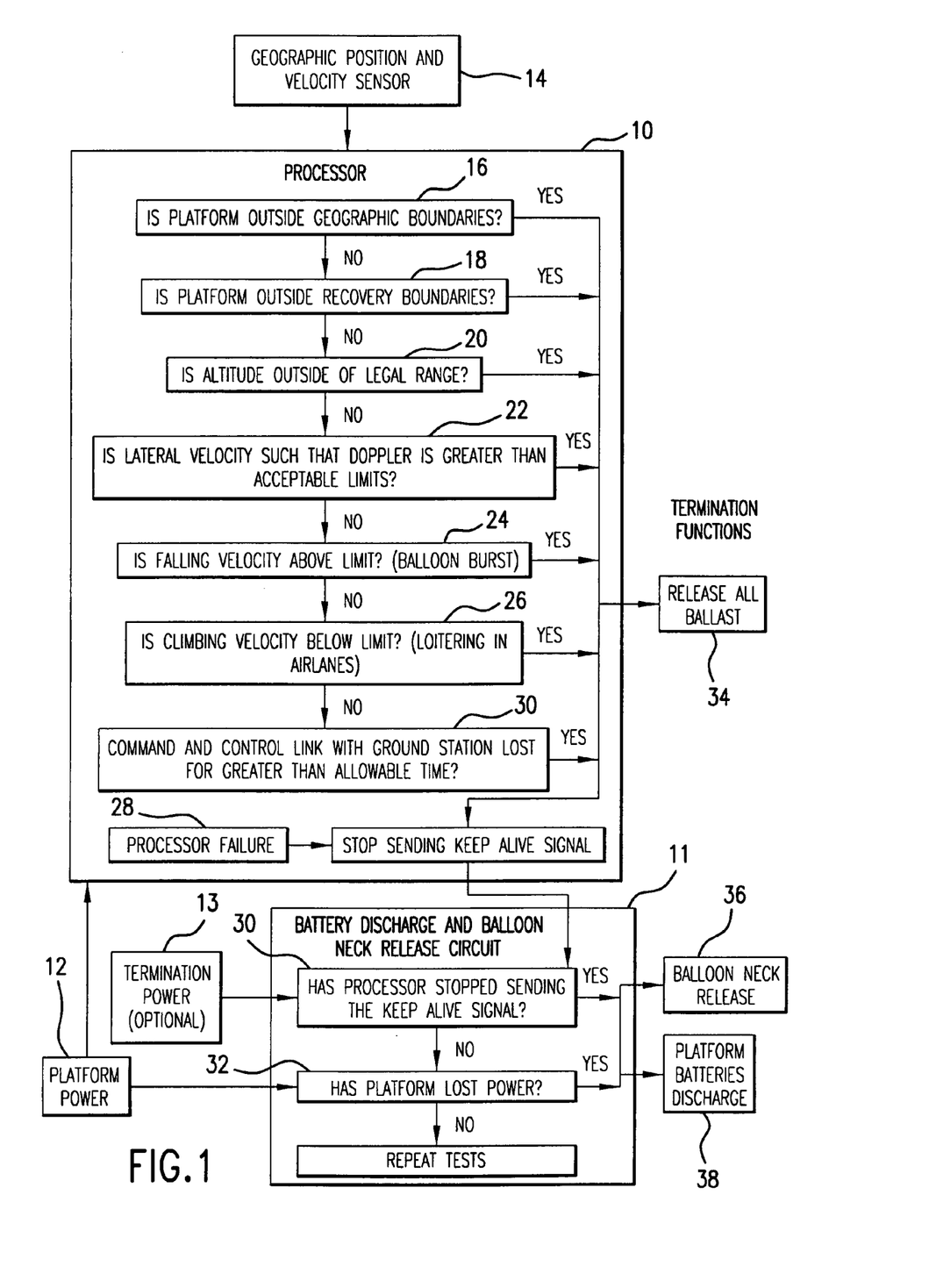
FIG. 1 schematically depicts a flow diagram of combined methods of a termination decision by a processor or controller including termination criteria, criteria detection by sensing of geographic position and velocity and elements of operation according to certain aspects of the invention.

FIG. 1 schematically depicts a flow diagram of combined methods of a termination decision by a processor including termination criteria, criteria detection by sensing of geographic position and velocity, and elements of operation according to certain aspects of the invention. In combination with an onboard power source 12 and GPS 14 (or other geographic locator or tracking system), a processor 10 is provided to receive position information and time change of position (velocity) information 14. The position information is compared to stored or programmed criteria information at 16, 18, 20, 22, 24, 26, 28 and 30, to determine whether termination of radio transmission and/or termination of flight should be implemented.

The following criteria based decisions are provided with the processor 10:

Has the Platform Moved or Drifted Outside of a Certain Geographic Area?

See FIG. 1, at 16

The relevant boundaries may be frequency license borders set by the FCC as dictated by a regional or nationwide broadcasting license. The FCC prohibits transmitter operation outside such geographic borders. Additionally, a neighboring country may have restrictions on transmitted power into their country from a foreign transmitter. It has been found that on certain frequencies Mexico prohibits transmit power levels above −99 dBm into Mexico from the United States. These restrictions are not hard for terrestrial towers to comply with as the towers can install and adjust directional antennas once during installation and not have to adjust them again thereafter. This is quite different for a free drifting high altitude ballooncraft containing a transmitter as the position and altitude may be constantly changing and may require the platform to stop transmitting while still inside the United States, but within a protective number of miles of the United States-Mexico border. Long duration scientific ballooncraft are not as concerned with this as they typically work on special frequencies or have coordinated with other countries that may be over flown.

Is the Platform Moving Outside of Boundaries that would Significantly Reduce the Probability of Recovering the Platform?

See FIG. 1 at 18

As payloads costs may be significant, from $50 to $150 for a typical weather service radiosonde, up to hundreds of dollars for a transceiver platform, and up to many tens of thousands of dollars for a scientific payload, recovery is important both financially and for environmental reasons. A platform may encounter strong winds especially in the jet stream as it descends from high altitudes. In order to keep the platform from drifting out of the country on descent, artificial borders that take into account the winds during descent can be used. Also, boundaries of large bodies of water such as the great lakes, seas and oceans the crossing of which might hamper or prevent recovery of the platform upon normal decent, may be taken into account for termination of flight purposes.

Has the Platform Fallen Below or Risen Above a Set Altitude Range?

See FIG. 1 at 20

Most scientific and weather balloons reach altitudes above 60,000 feet, The FAA regulates airspace below 60,000 feet and discourages free floating craft or uncontrolled flight craft from loitering especially in commercial airlanes as they present a hazard to commercial planes. Current NWS weather balloons do not have the capability to terminate the flight if they start to hover below 60,000 feet. Even the large scale scientific balloons may become errant and free drift below 60,000 feet. (see the rogue scientific balloon example listed earlier).

Is the Platform Velocity Sufficient To Create an Unacceptably Large Doppler Shift in the Transmission Frequency?

See FIG. 1, at 22

A ballooncraft traveling in the jet stream may reach speeds of over 180 miles per hour. This creates a Doppler shift in the frequencies received on the ground. The FCC regulates the amount of total frequency drift allowed on transmissions. Doppler shift contributes to this total frequency drift and if great enough can cause the transmitter to transmit out of its allowed band. These requirements have not been considered or accounted for in the past as free drifting commercially transmitting platforms were not available. Therefore, the requirement that the payload be able to immediately stop transmitting past the speed at which the Doppler becomes too great is new.

Does the Platform Fall Rate Indicate a Balloon Burst?

See FIG. 1, at 24

A fast fall rate indicates that the balloon has burst and that the craft is falling.

Is the Lighter-than-Air Platform Rising Too Slowly During Ascent?

See FIG. 1, at 26

This indicates that the balloon is under-filled or leaking. A slow rise rate may present a danger to aircraft by loitering excessively at one altitude particularly at an altitude in designated air lanes.

Has the Processor, the Position Finding Equipment, or the Primary Power Failed?

See FIG. 1, at 28

A GPS, star tracker, or system power failure should initiate an on-board termination. The platform must be able to terminate without processor control or power.

Have Command and Control Communications been Lost?

See FIG. 1, at 30

Without command and control from the ground, the payload should cease transmission and the flight should be terminated.

The present inventive system detects the foregoing conditions by comparing current position, velocity, and operating conditions to stored, programmed or calculated criteria using an onboard processor or controller. The present invention utilizes a GPS unit and a processor to determine the current platform's geographic coordinates and velocities. A GPS unit or pressure sensor determines the platform altitude. The processor algorithms will implement the complete set of conditions listed above causing the ballast to be released at 34, the transmitter to be shut off at 38 and the flight terminated at 36 upon detection of a stored, programmed or calculated termination criteria. Under conditions of a power loss or processor failure, the transmitter will also be shut off at 38, and the flight will be terminated at 36. The methods and mechanisms for the termination actions are described more fully below.

A separate termination controller 11 which may be under separate power 13 monitors the primary platform power at 32 and monitors processor functions at 30 to determine if the processor 10 is functioning properly. Both the primary processor 10 and the separate termination controller 11 have the ability to terminate transmissions, by discharging the primary platform batteries at 38 and to terminate the flight by releasing the balloon at 36. The separate power source 13 may advantageously comprise a very small environmentally acceptable battery such as an alkaline watch battery.

The present invention solves certain past needs. This invention describes a system, method and design for use with lighter-than-air platforms that overcomes certain safety drawbacks of conventional unmanned lighter-than-air ballooncraft. The processor reduces or eliminates the chance of the platform becoming a free floating, uncontrolled transmitter by monitoring sensed coordinates and platform velocities (GPS, star tracker, etc) and by comparing the sensed information to known (stored, programmed or calculated) geographic or altitude based boundaries. If the processor determines that the platform is out of it's proper boundaries, termination is started. If the GPS fails, the processor also initiates termination. If the processor function unacceptably fails or if the primary power fails, termination and recovery is also automatically initiated with a secondary termination control circuit having its own small and environmentally acceptable power source. This does not require power from the primary power source of the platform.

Termination and recovery comprise several steps or actions as follows:

Releasing all Ballast to Reduce the Payload Density and Weight

Figure 2:
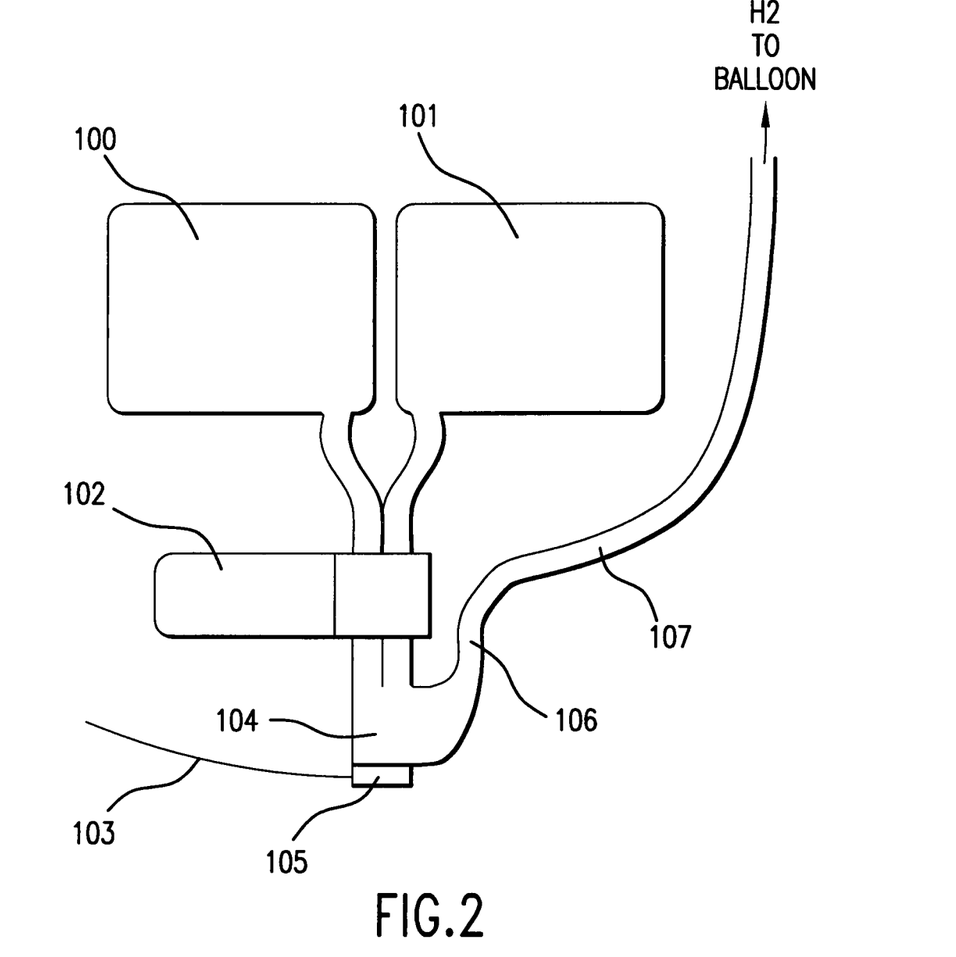
FIG. 2 schematically depicts a mechanism for the controlled release of ballast according to certain aspects of the present invention.

The following device allows for the controlled release of ballast (and generation of lifting gas) to reduce the ascent rate or slow down the descent rate. At termination, all ballast is released automatically according to a mechanism as schematically depicted in FIG. 2. Ballast system and release mechanism Both reactant A in chamber A (100) and reactant B in Chamber B (101) is metered into the reaction chamber (104) where hydrogen generation occurs. The relative size of each of the two chambers is determined by the molar ratio of the reaction. If water is used as one of the reactants and a fuel cell is used on the platform for generating power, the water byproduct of the fuel cell's reaction may be used for the ballast system reaction as one of the reactants. Different metering rates would be required for each reactant if the molar ratio of the reactants were not 1 to 1. This could be done with a dual peristalsis pump (102) if the tubing diameters were adjusted to pump the appropriate amount from each reactant chamber. During the reaction, hydrogen is vented from the reaction chamber through a tube (107) into the balloon. A one-way valve (106) in the tube to the balloon prevents hydrogen from flowing back into the reaction chamber. After the reaction is complete, the byproduct is dropped as ballast from the bottom of the reaction chamber (104) through an electrically actuated valve (105). The valve (105) is then closed. Upon flight termination, the reactants will be reacted as quickly as safely possible in the reaction chamber (104) and the byproducts dropped as ballast.

In a second configuration (not depicted), the ballast system consists of two cavities each containing one of the two reactants. The reactant in the top cavity is metered into the lower cavity where the hydrogen generation occurs. The reaction byproducts are only released as ballast when all of the original reactants are depleted.

In a third configuration, a hydrocarbon chain is reformed to produce hydrogen. This requires a catalyst such as platinum. Methods of reforming hydrocarbons to produce hydrogen are well known in the industry. The hydrogen is added to the lifting container and the remaining reacted reactants as dropped as ballast.

This method of hydrogen generation from the materials used for ballast effectively makes the payload lighter and therefore safer in the event of collision with aircraft or persons and property on the ground. While any acceptable ballast could be released, the novel ballast system described above effectively reduces the actual weight of ballast required by a system thereby increasing the safety of the payload. In the novel ballast system the total amount of ballast carried to provide long duration flight at an acceptable altitude is significantly reduced. Reducing the amount of ballast should in most cases increase safety. In one specific example, the system uses water and either Sodium Hydride or Calcium Hydride as the ballast. When additional altitude is required, a quantity of water is added to a quantity of Sodium Hydride or Calcium Hydride. A large volume of hydrogen gas is generated. This hydrogen is added to the lifting balloon and the byproducts of the reaction are dropped as ballast. The platform becomes lighter due to the dropping of the $Ca(OH)_2$ or $Na(OH)_2$ byproduct and at the same time, hydrogen is added to the balloon increasing lift. Only 73% (75% for Sodium Hydride) of an equivalent weight of inert ballast such as sand is needed. As ballast can be a significant portion of the initial total weight, reducing the weight of the ballast significantly reduces the total weight of the payload.

Releasing the Neck of the Balloon from the Platform to Initiate a Quick Descent

This makes sure the platform descends quickly through the atmosphere thereby reducing the potential time the payload passes through the commercial air lanes. Small balloon systems such as the NWS weather balloons rely on the balloon bursting due to expansion as it rises through the atmosphere. A hovering balloon does not experience this expansion and therefore must either have a system to burst the balloon or physically separate from the balloon. Venting the balloon is generally not acceptable because of the danger of the partially inflated balloon drifting laterally on the ground increases the chance of personal or property damage. A further problem would occur if hydrogen was used as the lifting gas. This could create a possibility of hydrogen remaining in the balloon after landing and contacting an ignition source. Bursting the balloon is also generally undesirable as a burst balloon still attached to the payload may foul the descent mechanism causing an uncontrolled descent. In the invention, the neck of the ballooncraft is released when power is lost or the processor fails eliminating these potential problems.

Figure 3:
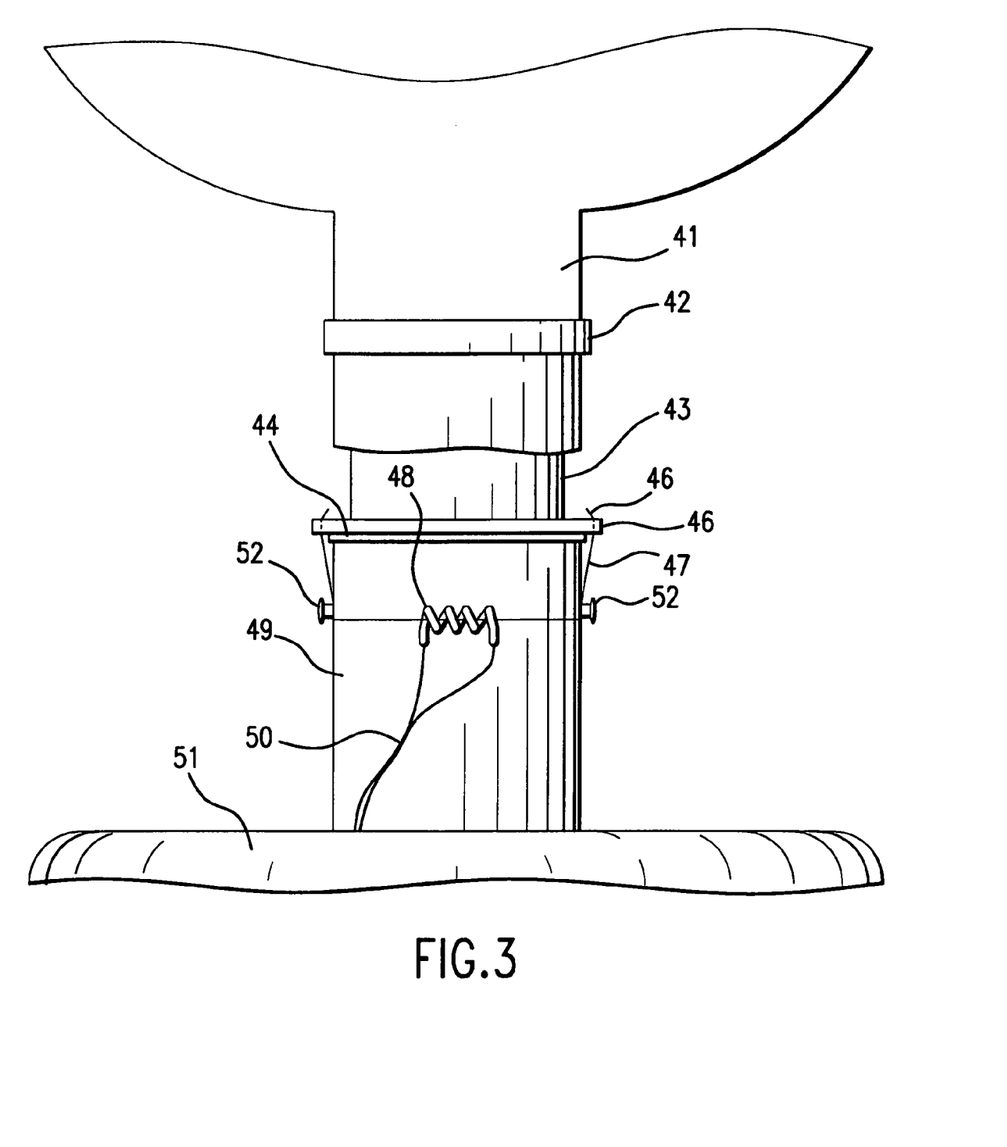
FIG. 3 is a schematic partial front view of a neck of a platform connecting between a balloon and a payload with a line and depicting the construction and method of releasing a balloon from the payload platform.
Figure 4:
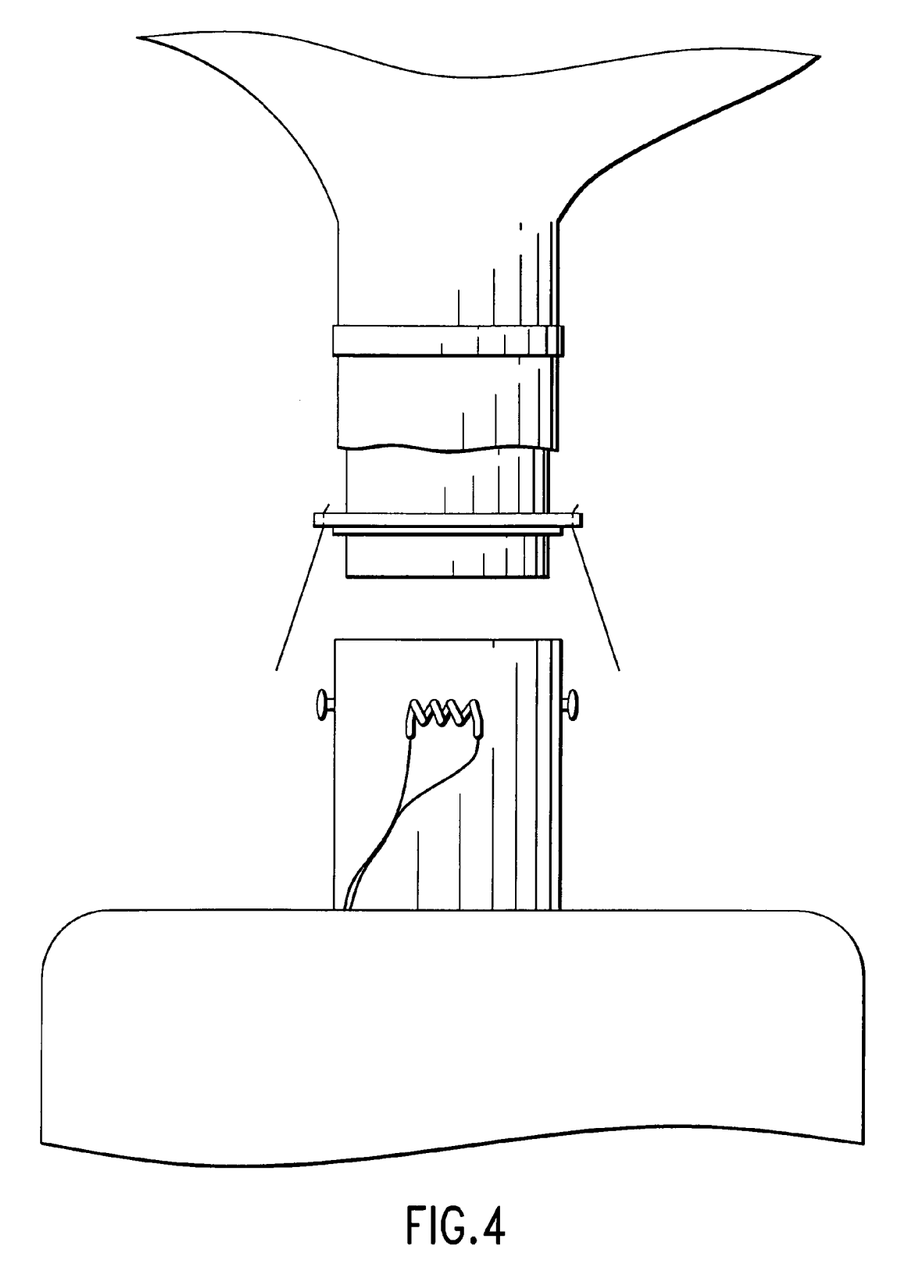
FIG. 4 is a schematic partial front view of the neck of a platform connecting between a balloon and a payload as in FIG. 3 further depicting the release of the balloon from the payload platform.

One possible implementation of the neck release mechanism as depicted schematically in FIGS. 3 and 4, comprises two concentric neck connection tubes (43) and (49). The top tube (43) is slid into and attached to the balloon (41) with a strap (42) or rubber band (42) and fits within the bottom tube (49) which is attached to the payload (51). The top tube (43) is restrained from sliding out of the bottom tube (49) by a piece of monofilament line (47). While top tube (43) and bottom tube (49) are restrained to each other, flexible seal (44) prevents gas in the tubes from leaking at the junction of the tubes. Each end of the monofilament line (47) is threaded through a small hole in flange (46) and tied off. The monofilament line (47) is threaded around two knobs (52) and also through and in contact with an electrically resistive coil (48).

A second implementation of the neck release mechanism utilizes a tube that is attached to the neck of the balloon as in the first implementation. The tube is removably attached to the payload by one or more latches. When these latches are undone, the neck can separate from the payload.

Figure 11:
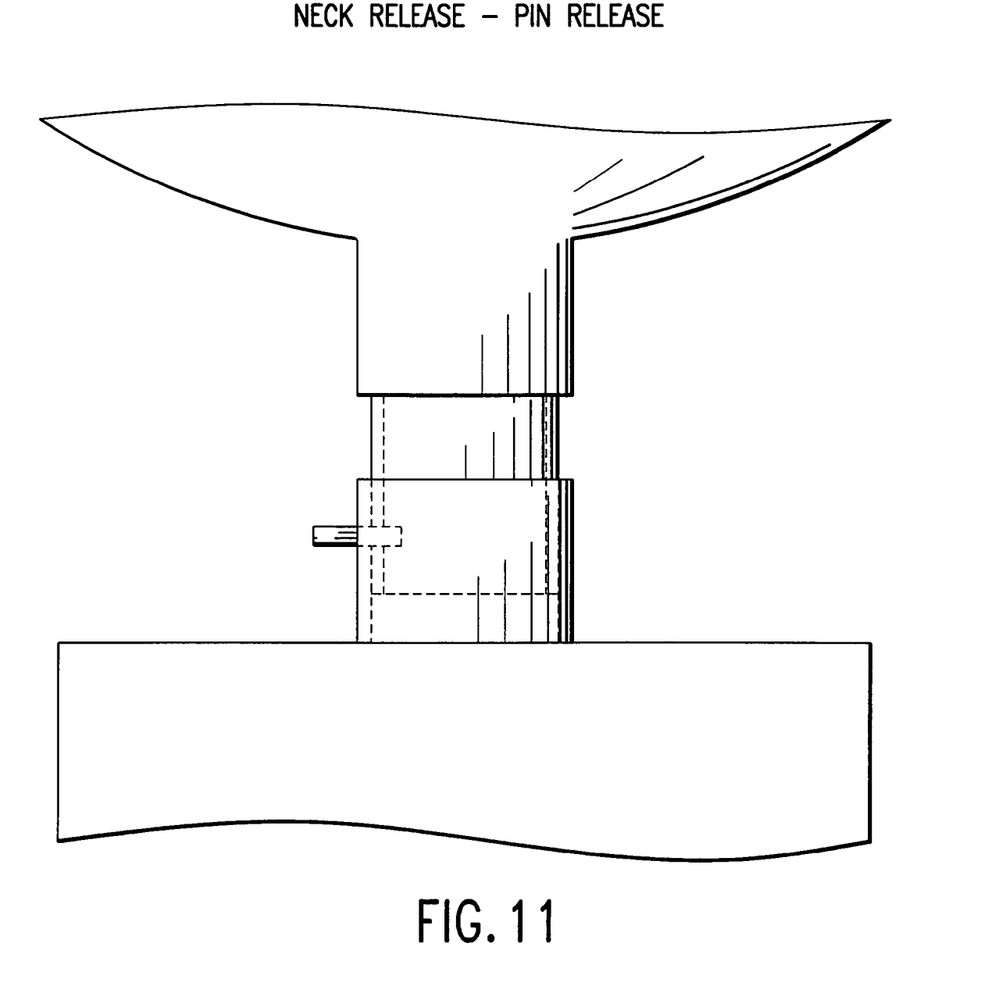
FIG. 11 is a schematic partial front view of a neck of a platform connecting between a balloon and a payload with a pin and depicting the construction and method of releasing a balloon from the payload platform.

In a third implementation of the neck release mechanism, a tube that is attached to the neck of the balloon as in the first implementation is axially aligned and slides within or over the second tube that is attached to the payload. A release pin or pins passes through both tubes from the side such that when the pin is removed, the tubes are free to separate from each other. See FIG. 11.

When termination of the flight is called for, the ballast is preferably released first and then a current is passed through the resistive coil (48). The coil heats (48) up and melts through the monofilament line (47). The weight of the payload (51) now pulls the bottom tube (49) from the top tube and the payload is released from top tube (43). and thus from the balloon (41). This ballast system advantageously allows for the venting of the lifting gas directly at the payload eliminating the need for wiring to remote valves.

The Battery Discharge and Neck Release Circuit

Figure 5:
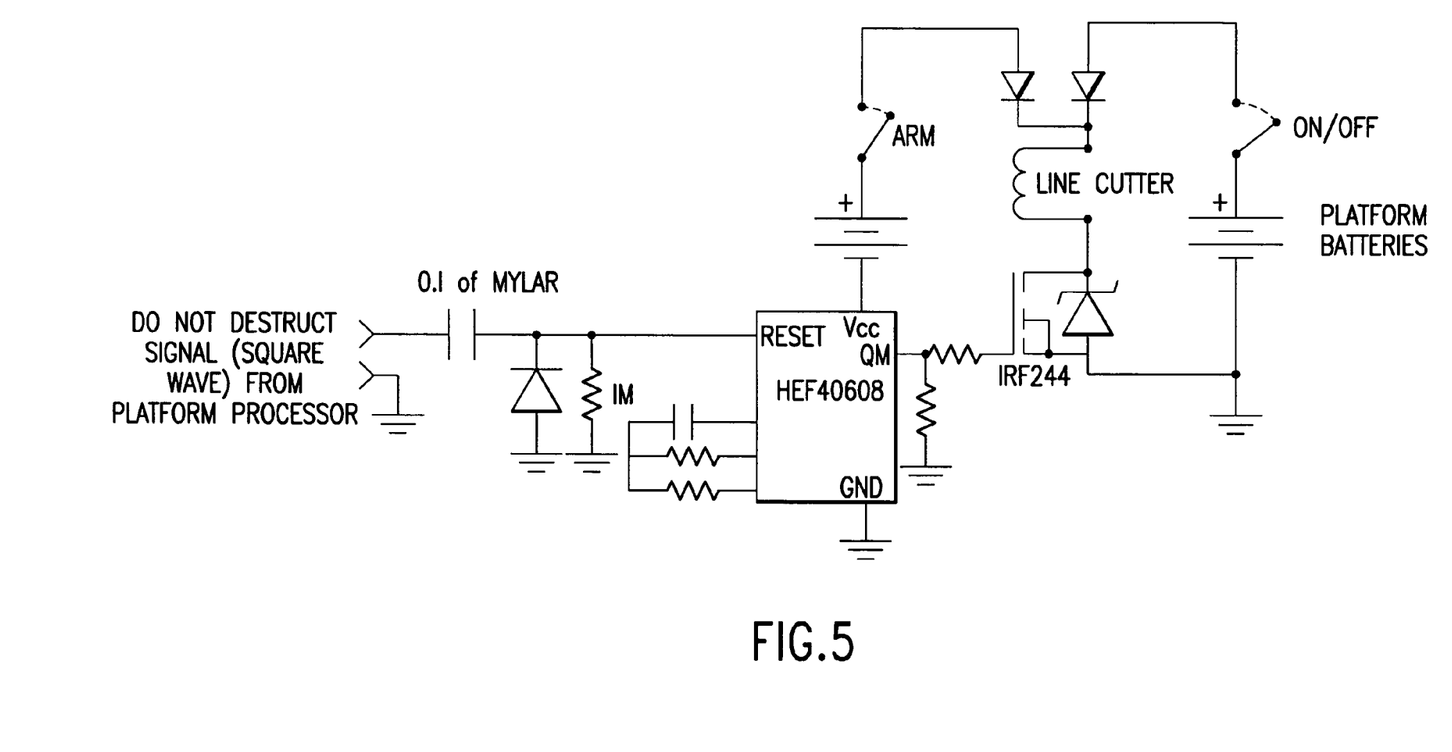
FIG. 5 is a schematic diagram for a battery discharge and neck release circuit.

The battery discharge and neck release circuit is schematically depicted in FIG. 5. The processor must constantly supply a keep alive signal to the battery discharge circuit in order to prevent the batteries from discharging. This keep alive signal consists of a square wave. The battery discharge circuit senses the low to high transitions in the keep alive signal and resets the timer (a HEF 4060) each time a transition is detected. The timer must be reset by the presence of the keep alive square wave or the timer will end it's counting and initiate the battery discharge. A high power FET closes the circuit that discharges the batteries. In one implementation of the discharge circuit, the power from the discharge circuit comes from the main batteries themselves. Because the discharge circuitry can function down to extremely low battery voltages, the batteries are effectively discharged by the time the discharge circuit is unable to function.

An alternate implementation uses a separate, non-hazardous, small battery to operate the discharge circuitry. This implementation ensures that the main batteries are completely discharged. The discharge circuit dissipates power through the resistive wire that during battery discharge, dissipates the energy as heat. The resistive wire is wrapped around a piece of monofilament (fishing) line. When the battery power is dissipated through the resistive wire, the monofilament line is melted through and the neck connecting the balloon to the platform is released from the payload. Another advantage of providing a separate power source for the discharge circuit is that the discharge circuit battery will supply the resistive element with power to cut the monofilament line even if the main batteries are dead. As an alternative, the discharge circuit could dissipates power through a high power resistor if the neck release function were not used.

If the processor senses any of the conditions necessary to initiate termination, it ceases sending the keep alive signal to the discharge circuit. If the processor dies or the power fails, the keep alive signal also ceases, causing termination. The timer advances to a point where it initiates the battery discharge. Battery current flows through the resistive wire discharging the batteries and melting through the monofilament to release the balloon neck. The battery discharge continues until the main batteries are completely dead.

The main platform batteries are fully discharged during descent to positively prevent further radio transmission. Once discharge is initiated, the batteries fully discharge. The battery discharge can be initiated by the processor as described above or automatically when power or processor control is lost. It has been found that long duration flight at high altitudes and cold temperatures requires special high density batteries. It has been found that lithium batteries beneficially fulfill such requirements. Additionally, it was found that the Environmental Protection Agency (EPA) states that lithium based batteries are considered hazardous waste except for one type of cell and only when fully discharged. Particularly it has been found that Lithium Sulfur Dioxide (LiSO2) batteries, when fully discharged, form a lithium salt which is not considered hazardous by the EPA. Automatically discharging the LiSO2 batteries before they contact the ground not only prevents the transmitter from transmitting but also renders the batteries non-hazardous.

The "Maple Seed" Descent Device

Figure 6:
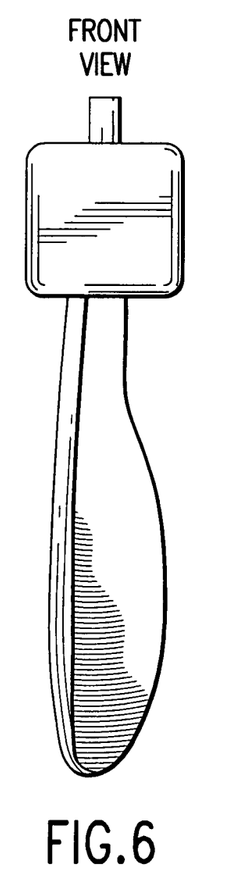
FIGS. 6, 7 and 8 are front side and end views, respectively, of a "maple seed" descent mechanism attached to the bottom of a platform according to one embodiment of certain aspects of the invention.
Figure 7:
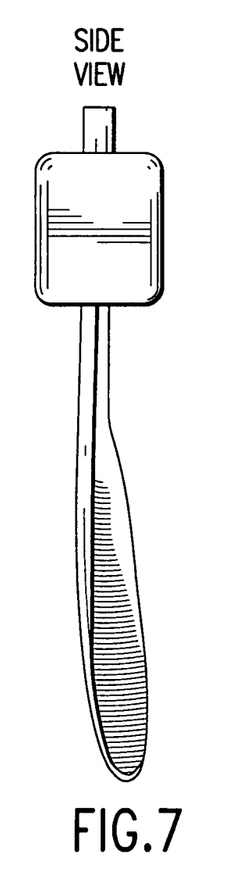
Figure 8:
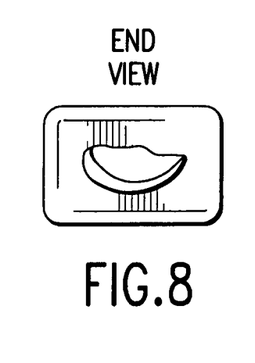

Use of a novel and integral "maple seed" like descent device to increase safety is depicted in FIGS. 6, 7 and 8. A single airfoil shaped blade attached to the bottom of the platform causes autorotation of the payload and airfoil blade upon rapid descent. This replaces a traditional parachute with a highly reliable decelerator that is generally immune to fouling and requires no deployment mechanism and is also immune to fouling problems with animals and property after descent. The "maple seed" decelerator may also be used to conveniently house the antenna.

This autorotation occurs because of the asymmetrical nature of the airfoil. The center of mass of the payload/airfoil combination is shifted well to the payload end while its center of lift is approximately in the middle. This causes a circular rotation of the entire assembly around its center of mass. The rotation actually inscribes a cone around the axis of fall. The shape of the cone will vary depending upon the aerodynamic qualities of the airfoil. An airfoil with minimal lift properties will inscribe a steep-side cone while an airfoil with strong lift properties will inscribe a very flattened cone.

Platform Recovery

Figure 9:
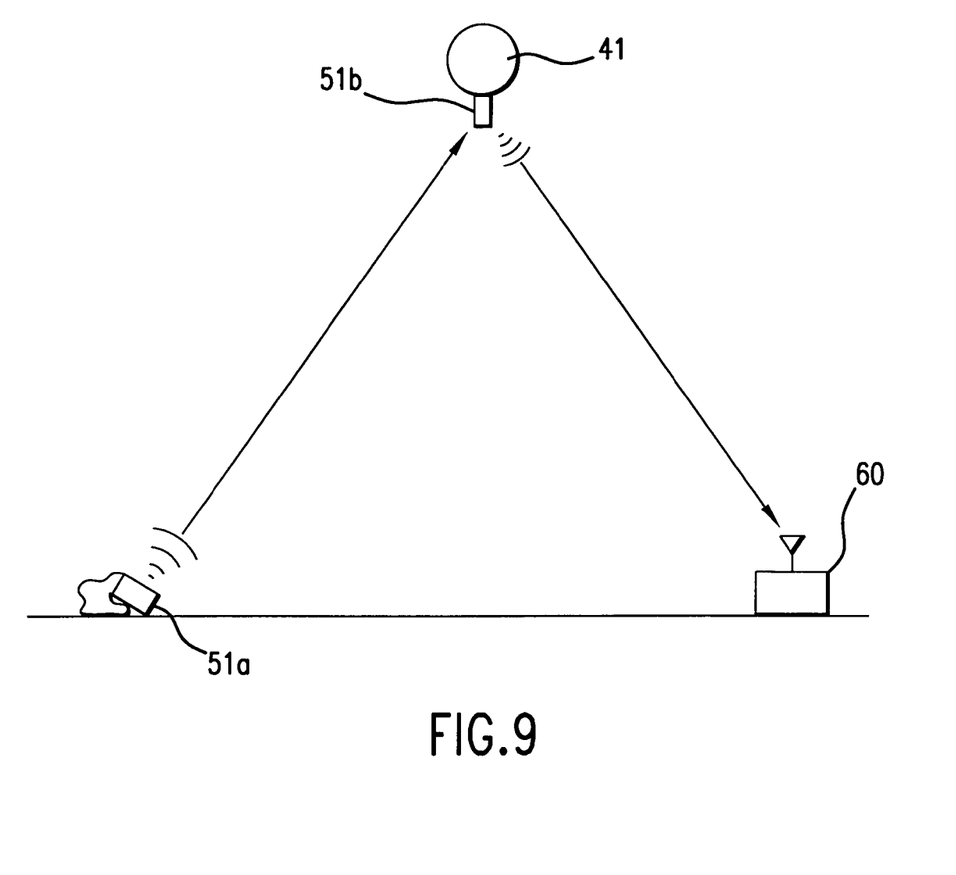
FIG. 9 is a schematic depiction of a landed terminated platform (with or without a balloon) transmitting a locator signal to a floating platform transceiver that relays the locator information to a ground station to facilitate recovery of the terminated platform.

A novel method of platform recovery is depicted in FIG. 9. To aid in the recovery of the platform, the landed platform transmits its last recorded position. to an additional airborne platform. The platform could determine that it had landed by comparing sequential position readings and noting when they consistently indicate no change in position. The second platform relays the current location of the landed platform to a ground station where the position of the landed platform is used to aid in recovery of the landed platform. The position of the landed platform could be determined by a GPS unit on the landed payload. The transmission from the landed platform to the additional airborne platform could utilize nearly any commercially available or custom transceiver.

The "Handoff" Mechanism

Figure 10:
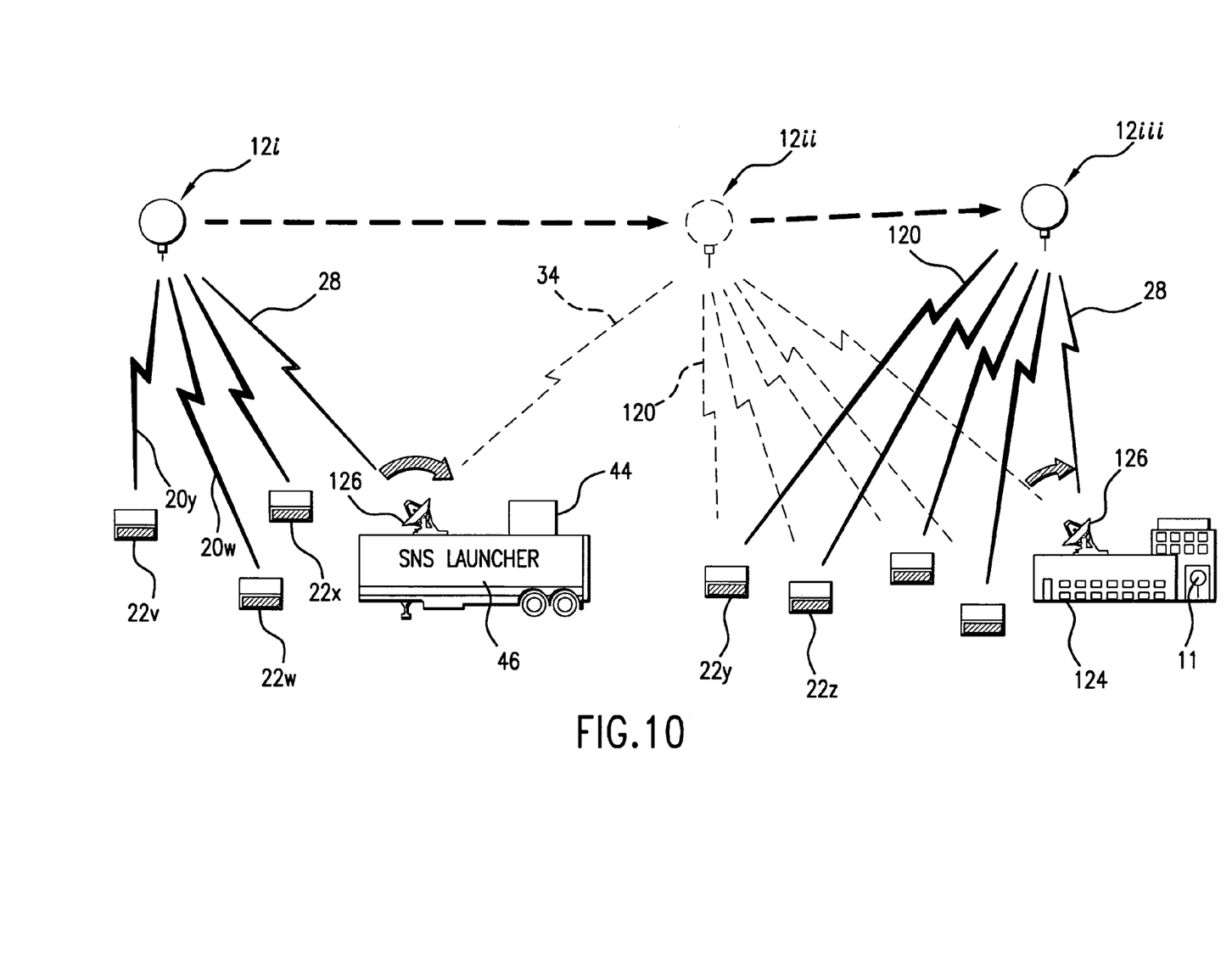
FIG. 10 is a schematic showing the hand-off mechanism.

FIG. 10 shows the capability of handoff, i.e., handing off signal, between platforms by the communications devices. FIG. 10 shows a schematic view of a portion of a constellation and communication network system in which 12(I), 12(ii) and 12(iii) air borne platforms. Each air borne platform comprises a lighter than air gas enclosure such as a balloon, and a transceiver (processor). Strong and weak signals between platforms and the communication devices (user equipment) 22v-z, located on or above ground, are shown by solid and dashed lines 120. The tracking antennas 126 could be located on ground terminal 124 or platform launcher, i.e., SNS launcher 46. Also, on the SNS launcher 46 could be a launcher 44. The command and control link between the tracking antennas 126 and platforms is shown by lines 28.

In particular, FIG. 10 shows communication devices 22y and 22z communicating with platforms 12(ii) and 12(iii). The signal from platform 12(iii) is stronger (as shown by solid lines) than that from platform 12(ii) (as shown by dashed lines). When platforms 12(ii) and 12(iii) migrate from left to right due to wind currents as shown in FIG. 10, communications devices 22y and 22z hand off communication with platform 12(iii) to platform 12(ii) as platform 12(iii) moves out of the communication range and platform 12(ii) moves to the former position of platform (iii). Generally, the processor(s) on board the platform(s) does not hand off the signal; it is the communication device(s) that initiates the handoff.

The communications signal transceiver comprises circuitry capable of communications using FDMA, TDMA, CDMA, and ReFLEX protocols. All of these named protocols use "handoff." For example, U.S. Pat. No. 5,649,000, issued Jul. 15, 1997, discloses a method and system for providing a different frequency handoff in a CDMA cellular telephone system. Devices using these protocols periodically scan for neighboring control channel in the background, without interrupting normal operations. If the device finds a better channel, in terms of significantly better signal strength or higher priority, it can request a transfer. This is usually done using "make before break," a concept similar to the soft hand-off used in PCS phone networks, where registration with a new channel is completed before communication with the old channel is broken. Normally, this means that a device will always be registered with the network, and capable of receiving messages. This permits communication devices to move quickly and efficiently across service areas with different control channels.

The invention claimed is:

1. A system to control a power source of a lighter-than-air platform, the system comprising:
    a power source including a battery configured to provide power to the lighter-than-air platform;
    a processor configured to control flight, radio transmission, or both, of the lighter-than-air platform; and
    a discharge circuit configured to discharge the battery to prevent radio transmission from the lighter-than-air platform, wherein the processor is configured to intermittently send a signal to the discharge circuit to prevent the battery from discharging, and wherein, responsive to the processor ceasing to send said signal, the discharge circuit discharges the battery,
    wherein the processor is configured to cease sending said signal to the discharge circuit in response to one or more conditions associated with the lighter-than-air platform being satisfied, said one or more conditions being selected from the group consisting of a geographic position, an altitude range, a platform velocity, a descent rate, an ascent rate, and a loss of command and control communications.

2. The system of claim 1, wherein the processor stops sending the signal when the lighter-than-air platform lands on ground or water.

3. The system of claim 1, wherein said signal sent by the processor to the discharge circuit comprises a square wave signal.

4. The system of claim 1, further comprising a termination power supply separate from the battery and configured to provide power to the discharge circuit.

5. The system of claim 1, wherein the discharge circuit comprises a timer that is reset in response to a transition of the signal sent from the processor.

6. The system of claim 1, wherein the discharge circuit comprises a resistive element configured to discharge the battery in response to the processor ceasing to send said signal.

7. The system of claim 6, wherein the resistive element comprises a resistive wire operably coupled to a neck release mechanism and configured to melt a meltable line arranged therein using heat dissipated by the resistive wire.

8. A system to control a power source of a lighter-than-air platform, the system comprising:
- a power source including a battery configured to provide power to the lighter-than-air platform;
- a processor configured to control flight, radio transmission, or both, of the lighter-than-air platform; and
- a discharge circuit configured to discharge the battery to prevent radio transmission from the lighter-than-air platform, wherein the processor is configured to intermittently send a signal to the discharge circuit to prevent the battery from discharging, and wherein, responsive to the processor ceasing to send said signal, the discharge circuit discharges the battery,
- wherein the discharge circuit is powered by a secondary power source separate from the battery, and wherein the processor is configured to cease sending said signal to the discharge circuit in response to one or more variable operational conditions associated with the lighter-than-air platform being satisfied, said one or more variable operational conditions being selected from the group consisting of a geographic position, an altitude range, a platform velocity, a descent rate, an ascent rate, and a status of command and control communications.

9. The system of claim 8, wherein the processor stops sending the signal when the lighter-than-air platform lands on ground or water.

10. The system of claim 8, wherein said signal sent by the processor to the discharge circuit comprises a square wave signal.

11. The system of claim 8, wherein the discharge circuit comprises a timer that is reset in response to a transition of the signal sent from the processor.

12. The system of claim 8, wherein the discharge circuit comprises a resistive element configured to discharge the battery in response to the processor ceasing to send said signal.

13. The system of claim 12, wherein the resistive element comprises a resistive wire operably coupled to a neck release mechanism and configured to melt a meltable line arranged therein using heat dissipated by the resistive wire.

14. A system to control a power source of a lighter-than-air platform, the system comprising:
- a discharge circuit configured to discharge a power source of the lighter-than-air platform to prevent radio transmission from the lighter-than-air platform, wherein the discharge circuit is further configured to receive a keep-alive signal from a processor of the lighter-than-air platform to prevent the power source from discharging, and wherein, responsive to the discharge circuit ceasing to receive the keep-alive signal, the discharge circuit discharges the power source,
- wherein the discharge circuit ceases to receive the keep-alive signal in response to one or more conditions associated with the lighter-than-air platform being satisfied, said one or more conditions being selected from the group consisting of a geographic position, an altitude range, a platform velocity, a descent rate, an ascent rate, and a loss of command and control communications.

15. The system of claim 14, further comprising a termination power supply separate from the power source and configured to provide power to the discharge circuit.

16. The system of claim 14, wherein the discharge circuit is configured to receive power from the power source of the lighter-than-air platform.

17. The system of claim 14, wherein, to discharge the power source, the discharge circuit is configured to dissipate power through a resistive element.

18. A system to control a power source of a lighter-than-air platform, the system comprising:
- a power source including a battery configured to provide power to the lighter-than-air platform;
- a processor configured to control flight, radio transmission, or both, of the lighter-than-air platform; and
- a discharge circuit configured to discharge the battery to prevent radio transmission from the lighter-than-air platform, wherein the processor is configured to intermittently send a signal to the discharge circuit to prevent the battery from discharging, and wherein, responsive to the processor ceasing to send said signal, the discharge circuit discharges the battery,
- wherein the discharge circuit comprises a resistive wire operably coupled to a neck release mechanism and configured to melt a meltable line arranged therein using heat dissipated by the resistive wire.

19. The system of claim 18, wherein said signal sent by the processor to the discharge circuit comprises a square wave signal.

20. The system of claim 18, wherein the discharge circuit comprises a timer that is reset in response to a transition of the signal sent from the processor.

* * * * *